Sept. 20, 1960      A. M. WRIGHT      2,952,974
TEMPERATURE CONTROL APPARATUS FOR TURBOJET ENGINE
Filed Sept. 3, 1958
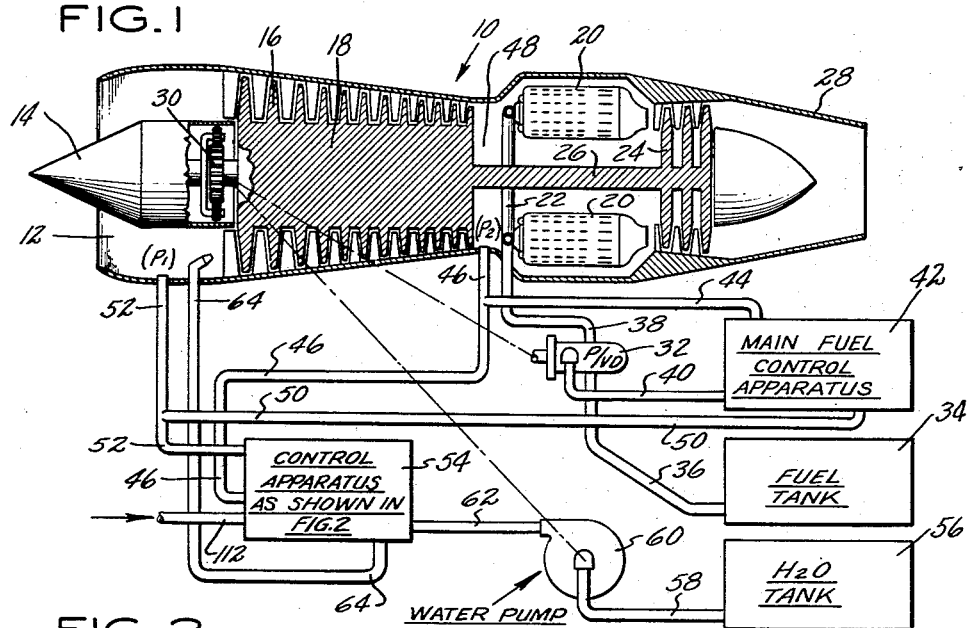
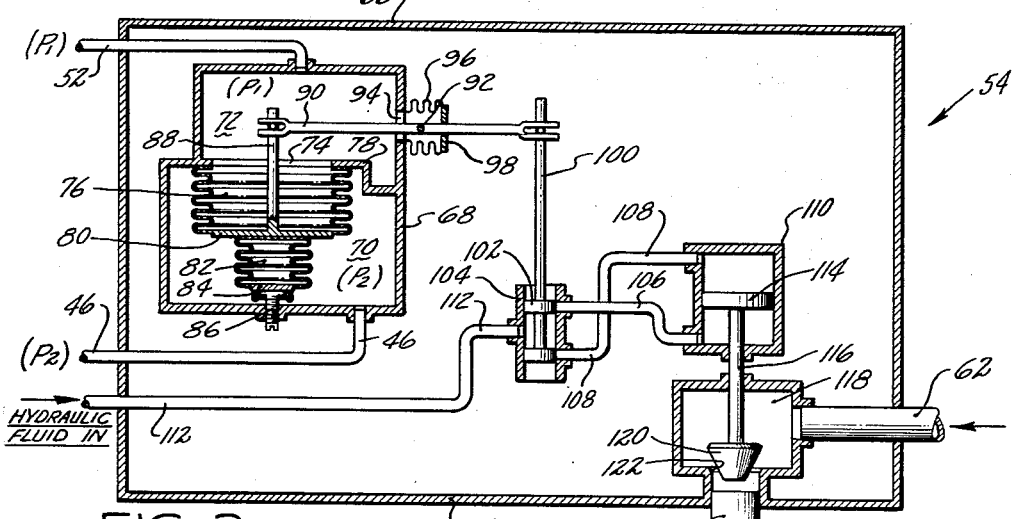
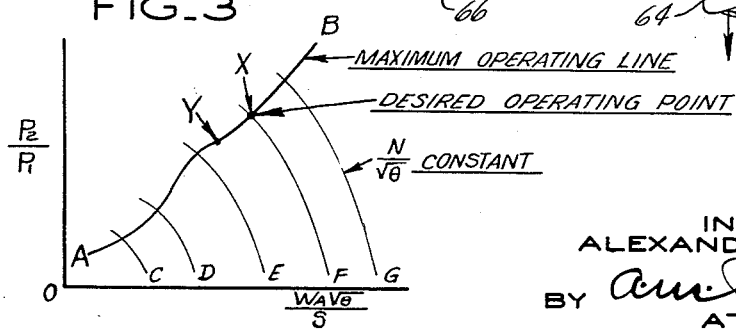
INVENTOR
ALEXANDER M. WRIGHT
BY
ATTORNEY United States Patent Office 2,952,974
Patented Sept. 20, 1960

2,952,974
TEMPERATURE CONTROL APPARATUS FOR TURBOJET ENGINE

Alexander M. Wright, West Hartford, Conn., assignor, by mesne assignments, to Chandler-Evans Corporation, West Hartford, Conn., a corporation of Delaware Filed Sept. 3, 1958, Ser. No. 758,699

15 Claims. (Cl. 60—39.3)

This invention pertains to water injection controls for aircraft turbojet engines, and more particularly has reference to such controls for turbojet engines which propel aircraft at supersonic speeds, where the temperature of the air entering the engine is greatly increased by the ram effect resulting from such speeds.

When aircraft are in flight, especially at supersonic speeds, it is highly desirable to maintain the thrust of the propelling turbojet engine when operating under high inlet air temperature conditions by cooling said air to some desired constant temperature which will be independent of the ambient air temperature; and this is one of the principal objects of my invention.

It is also highly desirable to achieve this result by means which does not necessitate the direct measurement of the temperature of the entering air, since such measurement requires the use of complicated apparatus and introduces sluggishment in the action of the control; and this is another prime object of my invention.

It is well established that there is, at any engine r.p.m., a definite relationship between the temperature ($T_1$) of the air entering the compressor of a turbojet engine and the compressor pressure ratio ($P_2/P_1$), where $P_1$ is the unit static pressure of the inlet air, and $P_2$ is the unit static pressure of the air discharged by the compressor. Accordingly, any variation in the temperature $T_1$ is reflected by a corresponding change in the compressor pressure ratio ($P_2/P_1$), as explained in more detail hereinbelow.

The basic concept of my invention comprises a device for measuring the departure of the compressor pressure ratio ($P_2/P_1$) from some preselected value, in conjunction with means for creating a force proportional to such departure which operates a metering valve to control the rate of flow of cooling water into the air inlet of the engine, so as to maintain the temperature ($T_1$) of the air therein at a preselected constant value, independent of ambient air conditions. If rate of water injection corresponding to the compressor pressure ratio ($P_2/P_1$), is so controlled that when ($P_2/P_1$) reaches a selected value corresponding to the desired air temperature $T_1$, and that particular rate of water flow is maintained until there is a new change in engine operating conditions, the temperature of the entering air will remain constant at the desired value. This is another object of my invention.

With these and other objects in view which may be incident to my improvements, my invention consists of the combination and arrangement of elements hereinafter described and illustrated in the accompanying drawing in which:

Figure 1 shows, somewhat diagrammatically, a turbojet engine with its associated main fuel supply system and a cooling water injection system, including my improved water injection control, together with the principal connections therebetween;

Figure 2 shows, also somewhat diagrammatically, a cooling water injection control apparatus embodying the principles of my invention; and Figure 3 is a diagram showing the relation of the principal factors in the operation of a turbojet engine, under varying operating conditions.

Referring to Figure 1, there are shown the principal elements of turbojet engine for propelling an aircraft at supersonic speeds, comprising: a supporting casing 10, an air inlet 12 with a concentric air deflecting spike 14, a multistage air compressor 16 with its rotor shaft 18, two of a number of combustion chambers 20, connected to a generally circular fuel manifold 22, a multistage gas turbine 24 with its rotor shaft 26 connected to compressor rotor shaft 18, a tail pipe 28 for discharging combustion exhaust gases to the atmosphere; and a gear train 30 connected to shaft 18 for operating the fuel pumps and other accessories.

The main fuel supply system to the engine includes a variable delivery fuel pump 32, driven from gear train 30, which receives fuel from a fuel tank 34 through a conduit 36 and delivers said fuel through a conduit 38 to fuel manifold 22. Fuel pump 32 varies its delivery in accordance with a variable control oil pressure in a conduit 40 which is regulated by a main fuel control apparatus 42, as disclosed in Patent No. 2,675,674, assigned to the same assignee to which this application is assigned. Fuel control apparatus 42 is connected by conduits 44 and 46 to a chamber 48 at the discharge outlet of compressor 16, and by conduits 50 and 52 to air inlet 12, so that the rate of fuel flow to the engine is regulated in accordance with compressor pressure ratio ($P_2/P_1$), as described in the patent cited.

The water injection control apparatus 54, (shown in detail in Fig. 2), is also connected by conduit 46 to chamber 48, and by conduit 52 to air inlet 12, so that apparatus 54 regulates the water flow to air inlet 12 in accordance with compressor pressure ratio ($P_2/P_1$), as hereinafter described. Water is supplied from a tank 56, through a conduit 58, centrifugal pump 60 (driven from gear train 30), and a conduit 62, to control apparatus 54, and said water is delivered from apparatus 54, through a conduit 64 to air inlet 12.

As shown in Fig. 2, water injection control apparatus 54 comprises a fluid-tight casing 66 which contains a fluid-tight chamber 68, connected by conduit 46 to compressor discharge chamber 48, and by conduit 52 to air inlet 12, whereby air is supplied to the lower part 70 of said chamber under compressor discharge pressure ($P_2$) and to the upper part 72 of said chamber, under the air inlet pressure ($P_1$). Upper part 72 communicates through an aperture 74 with the interior of a bellows 76 whose upper end is secured to a partition wall 78 which separates part 72 from part 70 of chamber 68. The lower end of bellows 76 is closed by a plate 80, to which is attached the upper end of an evacuated smaller bellows 82, whose lower end is attached to a disc 84, positioned by an adjustable screw 86 which is swivelly attached to plate 80.

Integrally attached to plate 80 is a stem 88, which extends upward through bellows 76 and is articularly connected to a lever 90 that oscillates about a fixed pivot 92. The upper part 72 of chamber 68 communicates through an aperture 94 with the interior of a sealing bellows 96 whose right hand end is closed by a disc 98 attached to lever 90, so that said lever may oscillate about its pivot 92 without escape of air from part 72 of chamber 68.

The right end of lever 90 is articularly connected to a stem 100 of a spool valve 102, slidably mounted in a sleeve 104 which is connected by conduits 106 and 108 to the lower and upper ends respectively of a cylinder 110. The interior of sleeve 104 is supplied, through a conduit 112, with hydraulic fluid under pressure from a source not shown; said fluid may be oil from the engine lubricating system, or liquid supplied from an independent source (not shown). Slidably mounted in cylinder 110 is a piston 114 having a rod 116 which extends through the bottom wall of cylinder 110 and the top wall of a valve chamber 118, and serves as the stem of a integral valve 120. Water from pump 60 enters chamber 118 through connecting conduit 62 and is discharged from chamber 118 through conduit 64 into air inlet 12. Valve 120 is suitably contoured to vary the area of the opening 122 from chamber 118 into conduit 64 and thus regulate the rate of water flow to air inlet 12, in such manner as to maintain the temperature of air entering compressor 16 from air inlet 12 at a preselected value, as described hereinbelow.

When the system in casing 66 is in equilibrium, valve 102 is in neutral position, wherein its lands just cover the ports into conduits 106 and 108, as shown in Fig. 2. If the compressor pressure ratio $(P_2/P_1)$ increases bellows 76 is compressed, and plate 80 moves upwardly causing a corresponding movement of spool valve 102, which permits hydraulic fluid under pressure in sleeve 104 to enter the upper end of cylinder 110 through conduit 108. Simultaneously, the fluid in the lower end of cylinder 110 escapes through conduit 106 into casing 66. This causes piston 114 to move downwardly and reduce the water flow through valve 120 until the system in casing 66 is again in equilibrium and valve 102 is returned to its neutral position. Conversely, a decrease in compressor pressure ratio $(P_2/P_1)$ causes piston 114 to move upwardly and increase the rate of water flow through valve 120 to air inlet 12.

The plate 80 of bellows 76 has an effective area $(A_1)$ subject to air inlet pressure $(P_1)$, acting downwardly, and disc 84 of bellows 82 has an effective area $(A_2)$ subject to compressor discharge pressure $(P_2)$. Plate 80 of bellows 76 also has an effective area $(A_1-A_2)$ subject to compressor discharge pressure $(P_2)$ acting upwardly. Accordingly, when the system is in equilibrium (i.e. displacement equal to zero)

$$P_2 \cdot (A_1 - A_2) = P_1 A_1$$

or $$\frac{P_2}{P_1} = \frac{1}{1-(A_2/A_1)}$$

hence, for example, if $A_2/A_1 = 6/7$, then $P_2/P_1 = 7$. If $P_2/P_1$ departs from the value as above determined, the servo valve 102 will be displaced to open or close water metering valve 120, as described above; and the cooling effect or temperature increase effect of the new water flow on the compressor inlet air will restore the compressor ratio $(P_2/P_1)$ to its preselected set value, and thereby maintain the temperature $(T_1)$ of the air entering through inlet 12 at a preselected desired value, irrespective of ambient air conditions.

The relation between the temperature $(T_1)$ of the air flowing through air inlet 12 and the compressor pressure ratio is explained by the following analysis of engine operation, as illustrated by the typical performance chart of a turbojet engine shown in Fig. 3, wherein the ordinates indicate values of compressor pressure ratio $(P_2/P_1)$, and the abscissas indicate "corrected weight flow" $(W_a\sqrt{\theta}/\delta)$, as percent of maximum "corrected weight flow" of air through the engine; where the $W_a$ is the rate of air flow in pounds per second, $\theta$ is the ratio of the temperature $(T_1)$ of the flowing air to sea-level standard air temperature (519°/R.), and $\theta$ is the ratio of the air inlet pressure $(P_1)$ to sea-level standard pressure 14.70 p.s.i.a. The curve A—B indicates the maximum permissible operating line, as limited to avoid compressor stall; and curves C, D, E, F and G show "corrected engine speed" $(N/\sqrt{\theta})$, as percent of maximum permissible engine speed, where N is engine speed (r.p.m.) and $\theta$ is temperature ratio mentioned above. On each of curves C, D, E, F and G, the "corrected engine speed" $(N\sqrt{\theta})$ has a constant value.

The desired engine operating point X corresponds to a value of $(P_2/P_1)$, of $(N/\sqrt{\theta})$, and of $(W_a\sqrt{\theta}/\delta)$. With the engine operating at constant governed speed N, an increase in temperature $(T_1$ or $\theta)$ of the incoming air results in a reduction in corrected speed $(N/\sqrt{\theta})$, a reduction in corrected air flow $(W_a\sqrt{\theta}/\delta)$, and a reduction in compressor pressure ratio $(P_2/P_1)$. That is to say, the operating point moves down the operating line (A—B) to some point such as Y, and thus at the new increased temperature the thrust (or output) of the engine is less than at the desired point X. To restore the operating point to X, my water injection apparatus injects water into the air inlet 12 as described hereinabove, and the evaporation of the injected water cools the incoming air and hence reduces the value of its temperature $(T_1$ or $\theta)$.

The control of my invention senses the compressor pressure ratio $(P_2/P_1)$, and when said ratio departs from the value required to maintain the temperature $T_1$ of the incoming air at its preselected desired value, the control regulates the flow of water to the air inlet, so as to restore the compressor pressure ratio $(P_2/P_1)$ to its desired value and thus restore the engine operating point to its desired point X (in Fig. 3). Thus, the temperature $(T_1)$ of the incoming air is maintained at a preselected desired value irrespective of ambient air conditions. It will also be appreciated from the above description and explanation that I achieve these results, without directly measuring the temperature $(T_1)$ and thus obviates the use of complicated temperature measuring devices which introduce sluggishness into the control.

In the foregoing disclosure, I have mentioned water as the air cooling medium employed, but it is to be understood that said term includes other cooling liquids, as for example, a mixture of water with alcohol and/or other liquids which lower the freezing point of water.

While I have disclosed the preferred embodiment of my invention, it should be understood that I do not limit my invention to the precise details of construction disclosed by way of illustration, as these may be changed and modified by those skilled in the art without departing from the spirit of my invention or exceeding the scope of the appended claims.

I claim:

1. In combination with an aircraft turbojet engine having an air compressor; means for injecting cooling water into the air entering said compressor, and means, responsive solely to the pressure ratio $(P_2/P_1)$ of said compressor, for regulating the rate of such injection inversely with said pressure ratio, so that the temperature $(T_1)$ of said air and said pressure ratio are maintained at constant, preselected values, irrespective of ambient atmospheric temperature and speed of flight.

2. The combination of claim 1, wherein said regulating means includes means for measuring the departure of said pressure ratio $(P_2/P_1)$, from a value corresponding to a change in said temperature $(T_1)$ from its preselected value, and means for varying the rate of said water injection in accordance with said departure, so as to restore said temperature $(T_1)$ to its preselected value.

3. The combination of claim 1, wherein said regulating means includes a positionable metering valve whose flow area is varied in accordance with said pressure ratio $(P_2/P_1)$.

4. The combination of claim 3, wherein said regulating means includes means for creating a force, proportional to the departure of said pressure ratio $(P_2/P_1)$, from a value corresponding to a change in said temperature $(T_1)$ from its preselected value, and means for varying the flow area through said valve in accordance with the magnitude of said force.

5. The combination of claim 4, wherein said force-creating means includes a bellows having a movable element with one effective area ($A_1$) subject to the unit pressure ($P_1$) of the air entering said compressor, and another smaller effective area ($A_2$) subject to an opposing pressure ($P_2$) of the air discharged by said compressure; said areas ($A_1$) and ($A_2$) having selected values such that $$\frac{1}{1-(A_2/A_1)} = \frac{P_2}{P_1}$$

6. The combination of claim 5, wherein said movable element is connected to said valve by means which positions said valve in accordance with the magnitude of the force exerted by said movable element.

7. The combination of claim 6, wherein said connecting means includes means for proportionally increasing the force exerted by said movable element on said valve, in accordance with a preselected proportion.

8. The combination of claim 1, wherein said water injecting means includes a centrifugal pump, driven by said engine.

9. In an aircraft turbojet engine having an air compressor, control apparatus for controlling the temperature ($T_1$) of the air entering said compressor, comprising: means for injecting cooling water into the air entering said compressor, and means, responsive solely to the pressure ratio ($P_2/P_1$) of said compressor, for regulating the rate of such injection inversely with said pressure ratio, so that the temperature ($T_1$) of said air and said pressure ratio are maintained at constant, preselected values, irrespective of ambient atmospheric temperature and speed of flight.

10. Control apparatus according to claim 9, wherein said regulating means includes means for measuring the departure of said pressure ratio ($P_2/P_1$), from a value corresponding to a change in said temperature ($T_1$) from its preselected value, and means for varying the rate of said water injection in accordance with said departure, so as to restore said temperature ($T_1$) to its preselected value.

11. Control apparatus according to claim 9, wherein said regulating means includes a positionable metering valve whose flow area is varied in accordance with said pressure ratio ($P_2/P_1$).

12. Control apparatus according to claim 11, wherein said regulating means includes means for creating a force, proportional to the departure of said pressure ratio ($P_2/P_1$), from a value corresponding to a change in said temperature ($T_1$) from its preselected value, and means for varying the flow area through said valve in accordance with the magnitude of said force.

13. Control apparatus according to claim 12, wherein said force-creating means includes a bellows having a movable element with one effective area ($A_1$) subject to the unit pressure ($P_1$) of the air entering said compressor, and another smaller effective area ($A_2$) subject to an opposing pressure ($P_2$) of the air discharged by said compressure; said area ($A_1$) and ($A_2$) having selected values such that $$\frac{1}{1-(A_2/A_1)} = \frac{P_2}{P_1}$$

14. Control apparatus according to claim 13, wherein said movable element is connected to said valve by means which positions said valve in accordance with the magnitude of the force exerted by said movable element.

15. The combination of claim 14, wherein said connecting means includes means for proportionally increasing the force exerted by said movable element on said valve, in accordance with a preselected proportion.

References Cited in the file of this patent

UNITED STATES PATENTS

| | | |
|---|---|---|
| 2,689,452 | Jordan | Sept. 21, 1954 |
| 2,863,282 | Torrel | Dec. 9, 1958 |

FOREIGN PATENTS

| | | |
|---|---|---|
| 687,480 | Great Britain | Feb. 18, 1953 |